United States Patent [19]
Togher et al.

[11] Patent Number: 6,014,627
[45] Date of Patent: *Jan. 11, 2000

[54] CREDIT MANAGEMENT FOR ELECTRONIC BROKERAGE SYSTEM

[75] Inventors: Michael Togher, New York, N.Y.; Michael F. Dunne, Boonton; Richard Hartheimer, Morris Plains, both of N.J.

[73] Assignee: EBS Dealing Resources, Inc., New York, N.Y.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/665,594

[22] Filed: Jun. 18, 1996

Related U.S. Application Data

[63] Continuation of application No. 08/324,843, Oct. 18, 1994, abandoned, which is a continuation of application No. 07/830,408, Feb. 3, 1992, Pat. No. 5,375,055.

[51] Int. Cl.[7] ..................................................... G06F 19/00
[52] U.S. Cl. ............................... 705/1; 395/237; 395/238
[58] Field of Search .................................... 395/237, 244, 395/238; 340/825.26, 825.27

[56] References Cited

U.S. PATENT DOCUMENTS

| | | |
|---|---|---|
| 4,980,826 | 12/1990 | Wagner . |
| 5,038,284 | 8/1991 | Kramer . |
| 5,077,665 | 12/1991 | Silverman et al. . |
| 5,136,501 | 8/1992 | Silverman et al. . |
| 5,375,055 | 12/1994 | Togher et al. ......................... 364/408 |

FOREIGN PATENT DOCUMENTS

| | | |
|---|---|---|
| 0 411 748 | 5/1990 | European Pat. Off. . |
| 0 512 702 | 4/1992 | European Pat. Off. . |

OTHER PUBLICATIONS

Declaration of William Lloyd Donner, Jan. 1998.
Money Match, Functional Specification, Version 1, Aug. 1990, The Sequor Group Inc. Software Services.

(List continued on next page.)

*Primary Examiner*—Donald E. McElheny, Jr.
*Attorney, Agent, or Firm*—Fulbright & Jaworski LLP

[57] ABSTRACT

An anonymous trading system (FIG. 1) identifies the best bids and offers (QuoteSubmit, FIG. 3) from those counterparties (WS A1a1) with which each party (WS A1b1, WS A1b2, . . . WSA2a2) is currently eligible to deal, while maintaining the anonymity of the potential counterparty and the confidentiality of any specific credit limitations imposed by the anonymous potential counterparty. To that end, each bid or offer (QuoteSubmit, FIG. 3) for a particular type of financial instrument is prescreened by the system for compatibility with limited credit information (for example, a one bit flag indicating whether a predetermined limit has already been exceeded) and an anonymous "Dealable" price (24,26) is calculated for each of the traders (WS A1b, . . . WS A2a) dealing with that particular financial instrument.

29 Claims, 6 Drawing Sheets

OTHER PUBLICATIONS

Earle, Dennis M. New Path for Trade Settlement, Wall Street Computer Review.

Schmerken, Ivy Banks Eye Forex Matching Systems, Wall Stree Computer Review, vol. 9, No. 2, p. 45.

Campbell, Carl M. Jr., A Microprocessor–Based Module to Provide Security in Electronic Funds Transfer Systems, IEEE Compcon, Fall of 1979.

Wilson, John F., On–Line International Cash Management, Annual ACM Conference, 1983.

Burman, Michael, Aspects of a High–Volume Produciton Online Banking System, IEEE Compcon, Spring of 1985.

Weintraub, B.A., Managing Change in a High Dollar Electronic Funds Transfer Environmnet, IEEE Compcon, Spring of 1987.

Sammer, Harald W. Online Stock Trading Systems: Study of an Application, IEEE Compcon, Spring of 1987.

Malone, Thomas W., Yates, Joanne, Benjamin, Robert I., Electronic Markets and Electronic Hierarchies, Communications of ACM, Jun. 1987.

Clemons, E.K., Row, C., Merrill Lynch Cash Mgmt Account Financial Svc: A Case Study in Strategic Info Systems, 21st Annual Hawaii Int. Conf. on Sysm Sci. 1988 V. 4.

Finebaum, M., Information Systems in the Securities Industry, 21st Annual Hawaii Int. Conf. on System Sciences, 1988, vol. 4.

Sager, M.T., Competitive Alliances with Info. Tech. The Australian Retail Banking Experience, 22nd Annual Hawaii Int. Conference on System Sciences, 1989, vol. 4.

Gutner, Tammi, Fine if You're Big, The Banker, Oct. 1988.

Arend, Mark, Swift Speeds up as Broker/Dealers Join, Wall Street Computer Review, Jan. 1989.

Essinger, James, ISE'S 'SAEF' Debuts to Make the Market Sound, Wall Street Computer Review, May 1989.

Freund, W.C., Electronic Trading and Linkages in Intn'l Equity Markets, Financial Analysis Journal, May–Jun. 1989.

Schmerken, Ivy, High–Tech Banks Set to Challenge Wall Street, Wall Street Computer Review, Jul. 1989.

Arend, Mark, Banks Lure Investors with High–Tech Convenience, Wall Street Computer Review, Dec. 1989.

Arend, Mark, Where Wall Street's Tending in Trading Systems Design, Wall Street Computer Review, Jun. 1990.

Brennan, P.J., OTC Trading Systems Lead in Race to Automate, Wall Street Computer Review, Nov. 1990.

Cody, B.J., Reducing the Costs and Risks of Trading Foreign Exchange, Wall Street Computer Review, Nov. 1990.

Arend, Mark, Seer Technologies Still Learning to Fly, Wall Street Computer Review, Jun. 1991.

Goodman, Ann, The MONEP: Mixing Men and Machines for Market Might, Wall Street Computer Review, Aug. 1991.

Heyman, D.P., A Performance Model of the Credit Manager Algorithm, Computer Networks and ISDN Systems, Mar. 1992.

Rihaczek, Karl, Teletrust, Computer Networks and ISDN Systems, 1987.

Hansell, Saul, The Wild, Wired World of Electronic Exchanges, Institutional Investor, Sep. 1989.

Turoff, Murray, Chinai, Sanjit, An Electronic Information Marketplace, Computer Networks and ISDN Systems, 1985.

Tulley, C., International Banking and Communications, Networks and Electronics Office Systems, 1985.

Method for Collection of Accounting Data, IBM Technical Disclosure Bulletin, 1986.

Banks Look to Build FX Order—Matching System Quotron Eyed as Vendor, Minex as Co–Sponsor?, FX Week, May 17, 1991.

TST Interviews Evan Schulman, Automated Trading Pioneer, Trading Systems Technology, Jul. 15, 1991.

Special Report: Citibank Mulls Strategy to Gain Control of Trading Systems, Trading Systems Technology, Oct. 7, 1991.

Staying in the Middle: . . . Brokers are Fighting to Keep Their Role in the Market; Includes Related Article on Crossing Networks, Wall Street Comp. Rvw., Dec. 1991.

Technology: ABN–AMRO Signs on Dotted Line as the Twelfth EBS Member, FX Week, Dec. 14, 1992.

Davis, Stephen G., Two Rivals to Reuters' F/X System April Launches, Bank Letter, Nov. 30, 1992.

Two Rivals to Reuters' F/X System April Launches, Wall Street Letter, Nov. 30, 1992.

Reuters to Offer Last–Trade Feed of Currency Rates, Inside Market Data, Jun. 8, 1992.

Jeffries, AZX, Others Team with Buy–Side Software System, Wall Street Letter, Jun. 8, 1992.

Clean Air Futures; Chicago Board of Trade's Proposed Emissions Credit Trading Program, Sulphur, May 1992.

Proprietary Execution: Minex Secures Asian Support for Order–Matching System, Trading Systems Technology, Jan. 27, 1992.

Goodman, Ann, New Trading Products Spawn New Systems; The Chicago Board of Trade is Building a New Electronic Trading System, Wall Street Comp. Rvw. Jan. 1992.

Proprietary Execution: Quotron, EBS Demo Prototype of Forex Order–Matching System, Trading Systems Technology, Nov. 4, 1992.

Eleven Banks, Quotron Unveil EBS Demo Anonymous Forex Order–Matching System, FX Week, Nov. 1, 1991.

Keith, C. The Overdue Revolution; Equity Trading in the Post–Electronic Age: A Working Plan for a Customer–Based System, Invstmt Dealer's Digest, Sep. 30, 1991.

AVCO Financial Corp.: Recurrence Software for the Serious Trader; Recurrence Real–Time Currency Trading System, Mag. of Comm & Options, Sep. 15, 1991.

Banks Ready to Give up on Reuters, Top of the Week; p. 16, Jun. 10, 1991.

Fingleton, Eamonn, Tokyo Takes on Reuters in the Race to Wire the Forex World, International Japan Journal; p. 35, Dec. 1990.

Arend, M., New Systems Lighten Load on Bank Securities Wings . . . , Wall Street Computer Review, Nov. 1990.

Republic National Bank of New York Selects Remos–FX, Newswire Assoc., Inc. Sep. 12, 1989.

Debow, Y., Foreign Banks Equip for Battle in the U.S.; Includes Related Article on The Union Bank of Switzerland's Private Network Expansion, Dealers' Digest 1989.

Schmerken, Ivy, What's Next on Wall Street's Automation Agenda? Trading Technology, Wall Street Computer Review, Apr. 1989.

VAX–11 Version of "IBIS" Released by Tymshare, Computer World May 9, 1983.

Proposed Rulemaking, Proprietary Trading Systems Securities and Exchange Commission, Apr. 11, 1989.

Letter from Robert A. McTamaney, Esq., Re: RMJ Securities Jan. 12, 1989.

Letter from Robert A. McTamaney, Esq.
Letter from Patteson Branch, Re: Exchange Services, Inc., Sep. 11, 1991.
Letter from Patteson Branch, Jun. 5, 1991.
Letter from Charles R. Hood, Esq., Re: Instinet Corporation Crossing Network, Jul. 1, 1992.
Letter from Lloyd H. Feller, Esq., Re: The Lattice Network, Sep. 9, 1993.

Letter from M. Pierre Fleuriot, Re: Distributions of Certain French Securities, Jun. 7, 1994.

Securities and Exchange Commission, Action: Policy Statement, Nov. 16, 1989.

Ivy Schmerken, The Electronic Broker that Could, Wall Stree Computer Review vol. 8, No. 12, p. 42.

| | | |
|---|---|---|
| Dealable Price Display (select one) | 80 — Regular Priority — | Best Dealable — |
| | | 82 |
| Currency Trading Pair | xxx/xxx — 72 | |
| Normal Trade Size | nnn — 74 | |
| Maximum Trade Size | nnn — 76 | |
| Price Time Limit | min. ___ sec. ___ | NTL y/n — 78 |
| Work the Balance based on (select one) | 82 — Complete + Partial — Partial — | None — |
| Cancel When Bettered | y/n — 78 | |
| Display EBS Best | y/n | |
| Display EBS Deals | y/n | |
| Display EBS Currencies | y/n | |
| EBS Currencies | xxx/xxx  xxx/xxx  xxx/xxx | xxx/xxx |
| | xxx/xxx  xxx/xxx  xxx/xxx | xxx/xxx |
| | xxx/xxx  xxx/xxx  xxx/xxx | xxx/xxx |

|  FLOOR | TFA1 | TFA2 | TFB1 | TFB2 |
|---|---|---|---|---|
| TFA1 | 0 | 1 | 0 | 1 |
| TFA2 | 1 | 1 | 0 | 1 |
| TFB1 | 0 | 1 | ///  | /// |
| TFB2 | 1 | 0 | /// | /// |

CREDIT MANAGEMENT FOR ELECTRONIC BROKERAGE SYSTEM

CROSS REFERENCE TO RELATED APPLICATIONS

This is a continuation of application Ser. No. 08/324,843 filed Oct. 18, 1994, now abandoned, which was a continuation of Ser. No. 07/830,408 filed Feb. 3, 1992 which has issued as U.S. Pat. No. 5,375,055.

TECHNICAL FIELD

The present invention relates generally to a electronic brokerage system having a communication network connecting traders dealing in financial instruments, and more particularly to a computerized system for distributing anonymous price quotes on a selective basis in accordance with previously established credit limits.

BACKGROUND ART

Reuters' published European patent applications EP 399 850, EP 407 026, and EP 411 748 disclose an automated matching system for anonymous trading of foreign currencies (or other financial instruments) in which a single host computer maintains a central data base consisting of all the trading instruments available for trade, credit information, and the various bids and offers that are present throughout the system. The host computer uses the information in its central data base to match active bids and offers (as well as executing any transitory "hit bid" and "take offer" transactions) based on matching criteria which include the gross counterparty credit limit between counterparties to a potential matching transaction, price, and available quantity. To that end, each client site establishes and may subsequently vary or reset a credit limit for each possible counterparty, which is used by the host computer to establish the gross counterparty credit limit for each possible pair of parties and which is equal to the minimum of the remaining credit (initial credit limit less any applicable transactions that have already been executed) from the first party to the second party and from the second party to the first party. The host computer blocks completion of an otherwise eligible matching transaction between a given pair of potential counterparties when the transaction has an associated value in excess of the applicable gross credit limit. In that system, the various client site computers (keystations) merely maintain and display a restricted subset of the information available at the central computer, such as a predetermined number of the best bids and offers, and communicate credit and other transaction oriented information to the host computer for execution. However, in an attempt to preserve the anonymity of the parties, the client sites do not have access to any credit limits set by their possible counterparties, or even to the identification of any other party to a particular transaction until after a transaction has been completed.

Thus, in the known prior art system, confidential counterparty credit limit data is maintained in real time and utilized as part of the trade matching process by a central host computer. As a consequence, each client site has no way to determine, prior to committing to buy or sell at a displayed price from one or more anonymous counterparties, whether it is in fact eligible to respond to any of the bids or offers currently being displayed. The client site is connected to the central host computer by telecommunication lines; the host computer is not under the direct control of the party providing the confidential credit limit data and thus provides potential opportunities for unauthorized access to the credit information, even though the host computer does not utilize the credit information until a match has been found between a Buyer and a Seller.

Consequently, unless he attempts to execute a trade at the best price currently displayed on his screen, a trader using the prior art anonymous matching system has no way of knowing whether he has credit with, and is willing to extend credit to, the anonymous counterparty offering (bidding) the best price currently displayed on his screen and thus whether any attempt to buy or sell at the displayed price will be subsequently invalidated by the system for lack of such credit.

SUMMARY OF THE INVENTION

It is an overall objective of the present invention to provide an anonymous trading system which can identify the best bids and offers from those counterparties with which each client site is currently eligible to deal, while maintaining the anonymity of the potential counterparty and the confidentiality of any specific credit limitations imposed by the anonymous potential counterparty.

To that end, each client site preferably provides the system with only limited credit information for each potential counterparty (for example, a one bit flag indicating whether a predetermined limit has already been exceeded) and each bid or offer for a particular type of financial instrument is preferably prescreened by the system for compatibility with that limited credit information before calculating an anonymous "Dealable" price for presentation to any of the traders dealing with that particular financial instrument.

In a presently preferred embodiment, the prescreening is a simple check to determine whether any credit remains between the two possible counterparties to the potential transaction, and thus may be performed using a simple yes/no Preauthorization Matrix before any bid or offer is transmitted to a particular client site.

In accordance with a preferred embodiment, such Preauthorization Matrices are maintained at each of several regional nodes ("distribution nodes") of a distributed processing communication network, with each such distribution node being connected by corresponding individual permanent links of the network to those client sites ("access nodes") for which it is responsible for distributing market information including customized "Dealable" bid and offer prices in addition to global "Best" prices.

More particularly, in the preferred embodiment, the sensitive credit limit data indicating how much credit a particular client site is willing to extend to each possible counterparty is maintained only at an access node associated only with that particular client, and only a simple yes/no indication of whether the entity (for example, a trader, a Trading Floor, or a bank) associated with that particular access node is willing to transact business with a particular counterparty is transmitted to the other nodes of the communication network.

To further limit the data received and processed by each of the relevant regional node computers, (ie, the distribution nodes closest to the particular site and/or closest to the particular counterparty), only changes in the credit state between a particular access node and a particular counterparty (ie, credit is no longer available or credit is now available) are transmitted to the distribution nodes, and any credit state information only relevant to transactions between two client sites both associated with other distribution nodes, may be altogether ignored.

In a preferred embodiment of the system as currently contemplated, if either of the two applicable limits has not already been exceeded between a particular pair of counterparties, the system displays the entire bid or offer as a "Dealable" transaction, but permits each client site to block any above-limit portion of any resultant buy or sell transaction during a subsequent deal execution/verification process. Alternatively, possibly at the option of the party by or for whom the low limit has been set, the entire transaction could be executed, or the entire transaction could be blocked. As a second alternative, the Preauthorization Matrix could indicate whether sufficient credit remained to execute a predetermined "standard" deal amount in addition to, or instead of, a mere indication as to whether any credit from a particular potential counterparty had already been used up. In such an alternate embodiment it might also be possible to display to each trader two "Dealable" prices: one at which at least the predetermined "standard" amount is available, and a second price at which only a "Small" amount may be available.

As currently contemplated, each of the regional nodes transmits both a Best current price (for which a predetermined minimum quantity is available independent of any credit constraints) and a best Dealable price (for which at least limited credit is presumably available on a bilateral basis with at least one of the counterparties making the bid or offer), as well as a "Small" indicator that may indicate a thin potential market in which that predetermined minimum quantity is not available at any price from any counterparty with whom the trader is eligible to deal, but nevertheless a smaller quantity is available from one or more of such eligible counterparties. In determining whether such a predetermined minimum quantity is available, the system may consider composite deals from more than one Maker or at more than one price, in which case the displayed price is preferably the least advantageous price included in the best such composite deal. In an alternative embodiment, the system does not take into account such composite deals when displaying a price, but still identifies the oldest quote at the best price as a potential match, thereby giving the traders the benefit of any price advantages for smaller sizes.

In accordance with another aspect of the preferred embodiment, at least the first Maker having an open quote that is displayable as the "Best Dealable" or "Regular Dealable" at any of the other Trading Floors is automatically alerted that his bid (offer) quotation is the Best price available to at least one potential counterparty with whom mutual credit exists, and thus could be hit (taken) at any time. Similarly, at least if the quoter's bid (offer) quote is not currently the first Best quote at at least one Trading Floor and is thus subject to immediately being hit (taken) by a trader at that Trading Floor, he is preferably also alerted if his quote is "joined" (ie, equal to in price, but later in time) to such a "Best Dealable" or "Regular Dealable" price from another Trading Floor.

Preferably, in accordance with another aspect of the invention, the system also determines whether a Quote has been "bettered"; that is to say, no longer qualifies as a Dealable quote (or joined to such a quote) at at least one potential counterparty. In that case, at the trader's option, the system will automatically cancel such a bettered quote.

In accordance with yet another aspect of the invention, the displayed Dealable price (unless accompanied by the "Small" indicator) is valid for at least a predetermined minimum quantity (which, as noted previously, may be a composite of small sizes from more than one source, or which always reflects a regular size from only one source, depending on system design tradeoffs and/or the trader preferences) and only prices and not quantities are displayed. However, assuming that the Best Dealable price for a regular quantity is greater than the best Small price, each trader may optionally select which of the two such Dealable prices is displayed.

When a "buy" or "sell" is made for a quantity in excess of the cumulative applicable credit limits associated with the counterparties having open quotes equal to or better than the displayed price and thus the completed transaction is for a cumulative quantity smaller than desired by the trader, the trader preferably then has the option of "working the balance" (in which the system automatically generates a bid/offer for the difference).

In accordance with yet another aspect of the invention, changes in the Dealable price and specifics of any subsequent transactions initiated by the trader are optionally vocalized electronically by the trader's terminal and provided to the trader in audible form, together with succinct details of any subsequent transactions. For example: Whenever there is a change in the Dealable "Buy" price, the least significant digits of that price are electronically converted to text which in turn is converted to digital speech using conventional speech synthesis circuitry.

The above description refers to the processing and distribution of data as though they were instantaneous processes; it will be appreciated by those skilled in the art that some delay is inherent in the type of system described, and that as a consequence, the information available at a particular processing node does not always reflect the most current information available anywhere in the system. However, at least in a preferred embodiment, any such delays in the display of Dealable price information may be kept within acceptable limits by transmitting only changes over the communication network, by using several processing nodes operating in parallel to compute the Dealable price information for different Trading Floors and/or different currencies, and by providing dedicated communication links between each processing node and its associated Trading Floors.

BRIEF DESCRIPTION OF THE DRAWINGS

Other objects and features of the present invention will be apparent from the following description of a presently preferred embodiment taken in connection with the accompanying drawings, in which.

DETAILED DESCRIPTION OF THE PREFERRED EMBODIMENT

Figure 1:
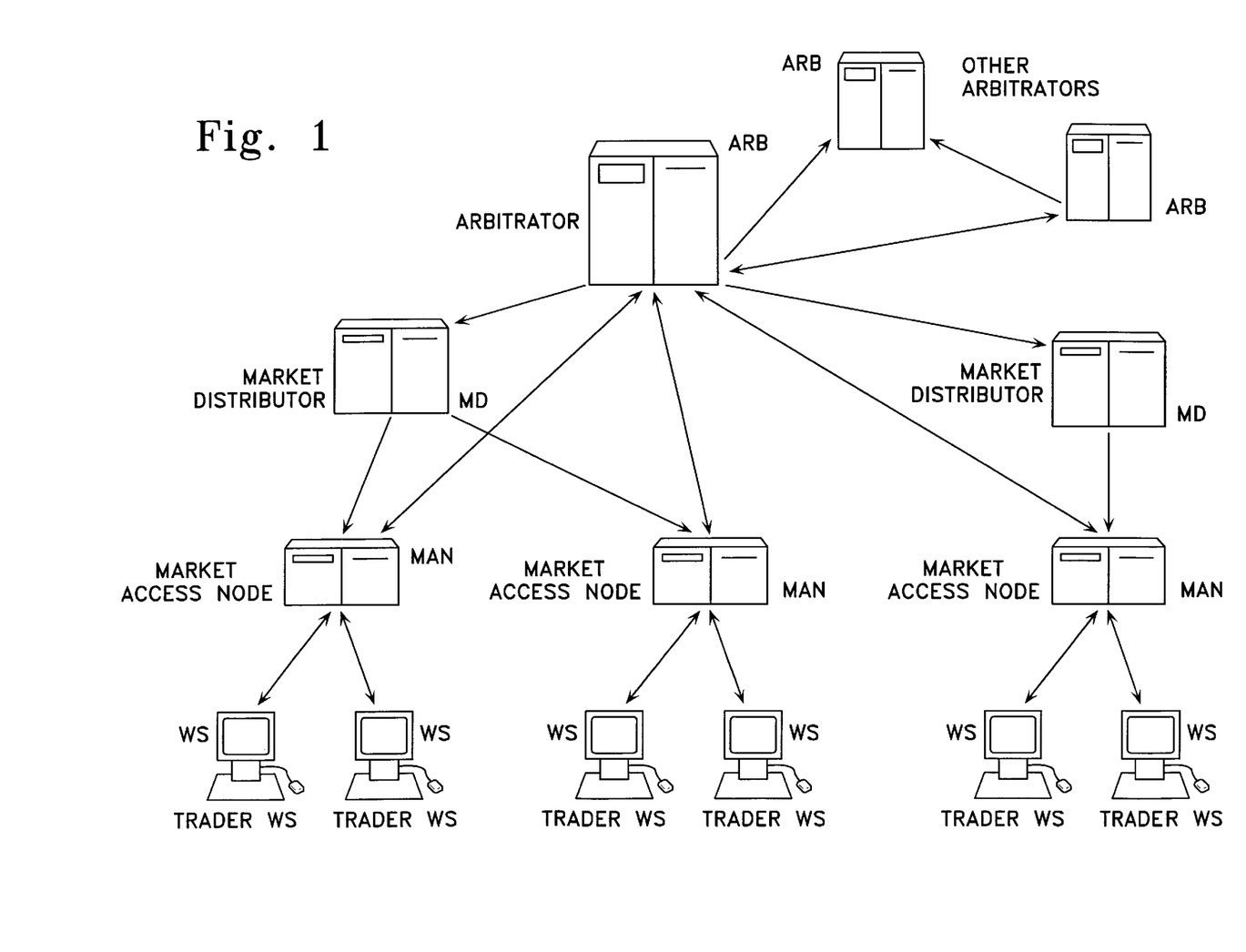
FIG. 1 is an overview of the Communication Network and the various workstations and processing nodes associated therewith.

In the described embodiment, the trading system is an electronic brokerage system having a communication network for facilitating the buying and selling of large blocks of foreign currency by traders each associated with his own Workstation ("WS") located at a Trading Floor of a subscriber bank ("client site"). As shown in FIG. 1, each client site has its dedicated client site computer ("Market Access Node", or "MAN") under the control of a Floor Administrator, which maintains transaction records, credit limits, and other confidential information originating with its associated Trading Floor. The WS's and the MAN associated with each Trading Floor are connected via a conventional self-repairing DEC VAX network to a nearby distribution node ("Market Distributor" or "MD") computer, which typically analyzes and distributes current market data by means of dedicated permanent communication links to one or more associated MAN's in a particular city (or other local region), and which may also provide administrative functions for the communication network. Although not considered critical to the present invention, a group of MD's is preferably supplemented by a common Trading Region processing node ("Arbitrator Node" or "ARB"), with the ARB performing those functions (such as identifying potential matches between Buyers and Sellers, and other aspects of the "Deal Matching" process that require coordination with more than one client site) which make the most efficient use of the communication network if done centrally or regionally, while the MD's perform those functions (such as generation of separate Dealable price information for each individual client site) which are readily implemented in parallel in a distributed processing network and which make most efficient use of the communication if done locally or in close proximity to the individual client sites.

In that regard, it is preferable to have more than one ARB, with each ARB having primary responsibility for trades initiated by Market Makers in the ARB's own Trading Region, and being connected to all the MAN's and MD's of that Trading Region as well as to the other ARB's in other Trading Regions by permanent dedicated links of the communication network. In the majority of deals, it is anticipated that both the Maker and the Taker will be within the same Trading Region and thus will be directly linked to the same ARB which can therefore identify a potential match and coordinate its final execution without any communication with the other ARB's; at the same time, the other ARB's can simultaneously be processing deals related to other traders in other regions. Connecting the various ARB's with one another by dedicated permanent communication links not only facilitates deals with a Taker in a remote Trading Region who does not normally have any direct link to the Maker's ARB, but also provides an efficient communication network for broadcasting price quotes to all the traders in other Trading Regions. Preferably, the various MD's, MAN's and ARB's are each provided with a local backup already connected to the communication network in accordance with the teachings of the commonly assigned US patent application entitled "ACTIVATION OF A DORMANT SIBLING COMPUTER IN A COMMUNICATION NETWORK" and filed Nov. 9, 1990 under Ser. No. 07/612, 0451; however, it is also possible, albeit wasteful of communication resources, to establish temporary communication links between the MAN's and MD's of one trading area and an ARB in a remote trading area, so that the remote ARB can function as an emergency backup for the local ARB. In any event, the system is preferably provided with a self-test and re-initialization capability to detect discrepancies between the local data bases maintained at each of the local (MD) and regional (ARB) processing nodes, and to regenerate missing or questionable data from corresponding data stored at other nodes.

Whether the communication links between nodes are permanent (maintained indefinitely between two network components) or temporary (established dynamically for a short period of time) they are preferably "logical links" which have the property that messages sent in a certain order over the same logical link are guaranteed to reach their destination in the same order. Moreover, the communication network is preferably provided with sufficient error detection, error correction, and network self-repair capability to guarantee that messages sent via these logical links are error free.

In summary, each MAN is connected to other MAN's by a robust communication network which connects the various Trading Floors and which supplements the MAN's with a number of processing nodes (preferably in the form of MD's and ARB's) to facilitate the distribution of price quotations and other market data and to execute transactions by matching eligible Market Makers with eligible Buyers and Sellers and by monitoring the transactions until they have been completed or aborted, with the MAN's being responsible for Trading Floor specific tasks such as logging the completed transaction and updating the credit limit that was previously available to the counterparty Trading Floor.

The structure and function of the trader WS's, MAN's, MD's, and ARB's will now be described in detail, with particular emphasis on how they cooperate to distribute price quotes (bids and offers) from a Market Maker to potential Takers throughout the system. In the prior art, such quotes were made available to the individual traders merely in the form of one or more public best prices for each currency pair (or other financial instrument type) then being offered by any Market Maker, without regard for any confidential credit restrictions imposed by the Maker or by the potential Taker that may prevent any deal being consummated. However, in accordance with the present invention, each trader receives a private Dealable price, which the system has prescreened for the absence of any credit restrictions that would prevent the trader on whose WS the Dealable price is displayed from dealing with an anonymous Market Maker from whom the displayed price originates.

Figure 2:
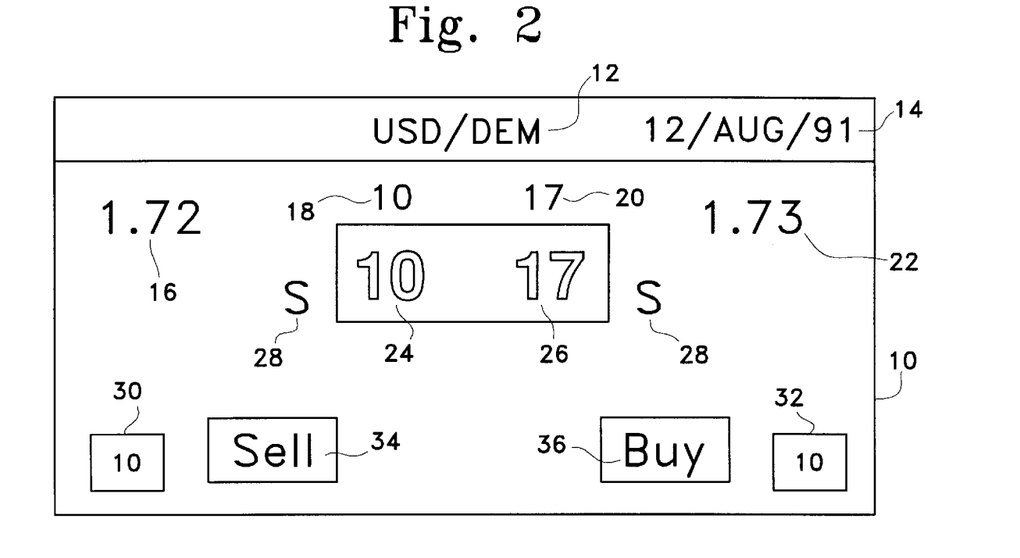
FIG. 2 depicts the trader's Buy/Sell display.
Figure 3:
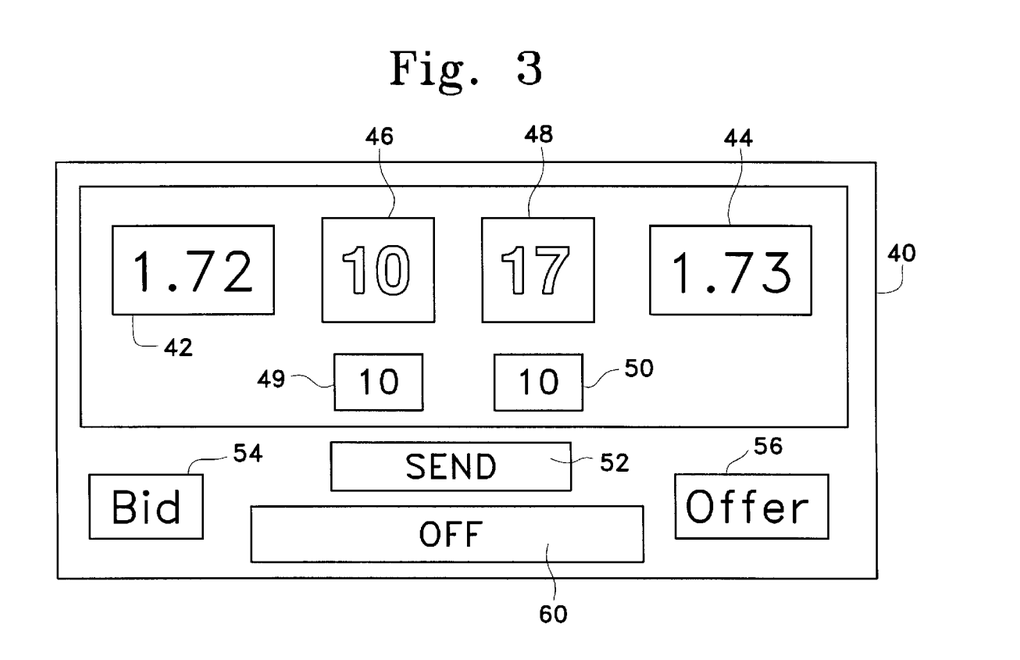
FIG. 3 depicts the trader's Quote display.
Figure 4:
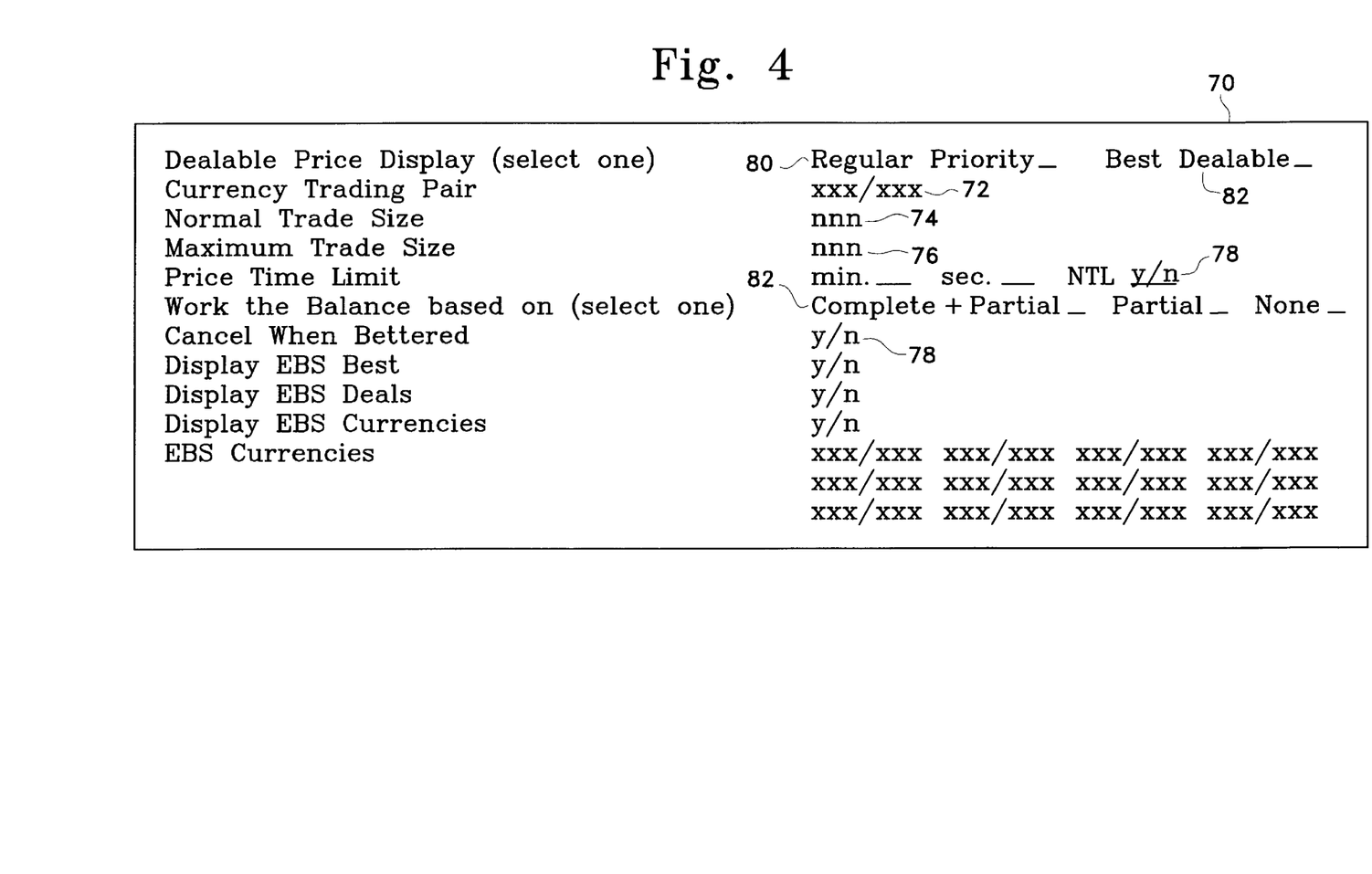
FIG. 4 depicts the Trader Profile Display.

As shown in FIGS. 2 through 4, each WS supports a single trader trading in a single currency pair, and its display thus provides one or two panels containing only information which a typical trader would consider essential to trading in that currency pair by means of an anonymous brokerage system. However, the blank portion of the WS display could obviously be used for other data related to another currency pair and/or another type of transaction. Furthermore, the displayed panel could be a window within a larger display that also displays data from other information distribution and transaction processing systems.

FIG. 2 shows the trader's Buy/Sell display panel 10 which provides the primary interface between the electronic brokerage system and the individual traders. At the top of the display appears the currency pair 12 (as shown, the Base Currency is United States dollars, Local Currency is German marks), and at the top right, the "Value Date" 14 (the date on which any resultant trade is scheduled for payment). The next line comprises (from left to right) : the "Figure" (the most significant three or four digits) 1 6 of the "Sell" ("bid") price, conventionally expressed in units of Local Currency (eg, DM 1.72) per single unit of Base Currency (eg, US$1.00); two additional digits 18,20 (commonly referred to as "Pips") which respectively reflect the remaining two or three least significant digits of the displayed "Best" bid and offer prices (ie, the best price at which at least one anonymous Market Maker is willing to buy the Local Currency, and the best price at which at least one anonymous Market Maker is willing to sell the Local Currency); and the "Figure" 22 of the "Best" offer price.

A Market Maker will always want to purchase a commodity at a lower price than the price at which he is willing to sell the same commodity and his bid price will thus be less than his offer price. Moreover, the trading system is preferably able to "automatch" a bid price from one Maker with an equal or lower offer price from another Maker, assuming that the two Makers have sufficient credit with each other. Accordingly, the displayed "Best price" 18,20 will normally reflect a price spread in which the offer price is equal to or higher than the bid price; however at times it may reflect an "Arbitrage Opportunity" in which a third party having credit with the two Makers is able to buy at a lower offer price from one Maker and sell at a higher bid price to the other Maker.

Furthermore, there is no requirement that a Market Maker must always quote both a bid price and an offer price for the same quantity of the Local Currency, or that if a bid (or offer) price is accepted by a Seller (or Buyer), any corresponding offer (or bid) price from that Maker will be (preferably at the trader's option) automatically withdrawn. Thus it is also possible that an offer price but no bid price (or vice versa) will be displayed as the Best price 18,20 at the top of the display.

As presently contemplated, the displayed Best bid and offer prices 18,20 are each valid for at least a predetermined quantity of currency (for example five million US dollars) from a single source. Since such a quantity may be available at the displayed price in a composite transaction involving more than one Maker and more than one price, it is possible that at least a portion of the transaction could be executed at a better price than the displayed Best price 18,20.

In accordance with the invention, a "Dealable" bid and/or offer price is derived only from those bids or offers from other Trading Floors which have been prescreened for at least some nominal level of remaining credit from the potential Maker to the potential Taker and vice versa, and at least the "Pips" 24,26 portion of the Dealable price is prominently displayed or otherwise communicated to the potential Taker.

In the illustrated example, the associated Taker (and any other USD/DEM traders on his Trading Floor) is thus eligible to sell German marks ("DEM") at the bid rate of 1.7210 marks per dollar ("USD"), or to buy at the offer rate of 1.7217 marks per dollar, and the system has already verified that the displayed Dealable price 24,26 is currently available from one or more anonymous Makers with whom the trader is currently still eligible to deal, and that those eligible Makers are willing (either collectively or individually, depending on the trader preferences and/or design tradeoffs mentioned previously) to sell (or buy) at least the same predetermined minimum quantity of the particular Local Currency involved as was used to determine the displayed Best price 18,20. Thus, a "regular" displayed Dealable price 24,26 will never be better than the displayed Best price 18,20; if worse than the Best price 18,20, this is an indication that the trader is barred by credit limitations from obtaining the best price that is then theoretically available. Indeed, because credit is established bilaterally, it is possible that the Maker (or Makers) behind the Best price have extended credit only to Trading Floors who currently have not extended any credit to those particular Makers, and thus that none of the traders at any of the client sites will see a Dealable price equal to the displayed Best price.

The foregoing implicitly assumes that the Best price 18, 20 and the Dealable price 24,26 are sufficiently close that the FIGS. 16, 22 are unaffected. If that is not the case, it is preferable that the displayed Figures correspond to the corresponding most significant digits of the displayed Dealable prices; if the "Pips" of the Best price are worse than the corresponding least significant digits of a displayed Dealable price, it will be apparent that the corresponding Figure of the Dealable price should be incremented or decremented by at least one digit to obtain the Best price.

Moreover, as with the Best price, it is possible that at least a small quantity is available from one or more Makers at a better price than that which is currently displayed as a regular Dealable price (or even that a better price becomes available after the price is displayed but before the Taker's Buy or Sell request is processed), in which case the trader may receive or pay an effective average price that is somewhat better than the currently displayed Dealable price. This will be the case whether the system has executed a single transaction only with a second Maker with whom the better price originated, or a composite transaction with that second Maker and the Maker with whom the displayed price originated.

Instead of a regular Dealable price, a Small price may be displayed, preferably identified as such (for example, by the letter "S") 28 and which differs from the regular Dealable price in that only a relatively small quantity is collectively available at any price from those Makers with whom the trader currently is eligible to deal. For example, if deal size is expressed in units of one million dollars, the Best price and the regular Dealable price may each represent available deals having a potential aggregate value (not necessarily all from the same trader) of at least 5 million dollars, while a Small price 14 represents available deals having a maximum potential value of between 1 and 4 million dollars.

Among the options available to each trader through his Trader Profile panel (see FIG. 4) is the ability to display either the regular Dealable price as described above, which is good for at least the previously mentioned predetermined minimum quantity (eg, at least 5 million dollars), or a best Dealable price which is the best price available to that trader for even a nominal minimum quantity (eg, only 1 million dollars).

Preferably, the trader has also previously specified a default transaction quantity using his Trader Profile Screen and the displayed Dealable price functions as the default value for the trader's requested transaction price. Thus, the trader may quickly and accurately respond to a new Dealable bid or offer price by merely activating a Buy button 34 or a Sell button 36, respectively on the screen, assuming that the display is touch sensitive or is provided with a "mouse" or other pointing device; alternatively the trader may use a small custom keypad having dedicated function keys for the various functions and dedicated size keys for various predetermined deal sizes as well as conventional numerical, tab and cursor keys. If the desired quantity 30, 32 is not available at the displayed Dealable price, as will be discussed in more detail with respect to FIGS. 3 and 4, any missed quantity may be the subject of a subsequent "working the balance" bid or offer.

In any event, the system gives the trader accepting a Dealable price the benefit of any undisplayed Small price from an eligible counterparty that is "behind" (ie, equal to or better than) the Dealable price. In that case, the Buy or Sell request would be executed as two trades, one at the undisplayed Small price, and the other at the displayed Dealable price.

As noted previously, the trading is performed electronically, and when a bid price is equal to or greater than an offer price, the two will normally be automatically matched, with the system automatically allocating any price difference between the two trader's in accordance with changes for any recent quotes or hits initiated by the trader. An exemplary trading scenario and the resultant vocalized communications is presented in Table 1.

TABLE 1

| Trader Action | Broadcast | Maker only | Taker only |
|---|---|---|---|
| Dealable price has Bid and offer | 10–17 | | |
| Bid side only | 10 bid | | |
| Bid size small | 10–17 Small Bid | | |
| Offer side only | 17 Offered | | |
| Offer size small | 10–17 Small Offer | | |
| Bid and Offer Small | 10–17 in Small Figure | | |
| Bid/Offer Pips = "00" | 10 Choice | | |
| Bid = Offer | Dollar/Mark please | | |
| No Bid/Offer available | Bid/Offer out | | |
| Dealable Bid/Offer removed | Off the Price | | |
| Bid and Offer removed | Change | | |
| Price change for Bid and Offer (worse only) | | | |
| You enter a Quote | | Bid/Offer/Price Posted | |
| Your Quote is best | 10–17 | Your Bid/Offer/Price | |
| Your Quote is Bettered by another Trader | | 14 Bid/Offered inside you | |
| You cancel Quote | | Bid/Offer/Price canceled | |
| Your Quote Joined by another trader | | Bid/Offer/Price joined | |
| You Join a Quote from another trader | | You join the Bid/Offer/Price | |
| Your Quote is no longer Joined | | Your Bid/Offer/price only | |
| Bid/Offer/Price you joined hit, but yours available | | Still watching your Bid/Offer/Price | |
| Your Bid is hit | 10 Given (Small) | 10 yours from Bank X | You Sell 10 to Bank Y |
| Your Offer is Taken | 17 Paid (Small) | You Sell 10 to Bank X | You Buy 10 from Bank Y |
| Your quote is partially dealt on | Working Your Balance of X | | |
| Maker's Quote not Hit for a period of time | | Still working your Bid/Offer/Price | |
| Taker's Attempt to hit a Bid or Offer failed (too slow) | | | Missed it |
| Taker's Buy/Sell missed | | | Working your Balance of X | previously agreed trading rules. Thus it is not likely that a displayed bid price 18,24 will be greater than a displayed offer price 20,26. However, if two traders are barred from dealing with each other because of credit limit restrictions but are both free to deal with a third trader, it is still possible that the third trader will be presented with an arbitrage opportunity.

When the Dealable price 24,26 originates with the trader himself (or another trader on the same Floor), the trader is preferably alerted to that fact by displaying his price as the Dealable price, but in a visually distinctive manner and with the corresponding Buy or Sell function 34, 36 optionally inhibited. Thus, his Trading Floor may be prevented from in effect dealing with or against itself.

In accordance with another aspect of the invention, the displayed price data may optionally be "vocalized": whenever there is a change in the displayed prices, the numerical data is electronically converted to text which in turn is converted to digital speech using conventional speech synthesis circuitry. In that event, it is preferable that only the "Pips" of the "Dealable" price quotes are announced (unless, due to a large spread, this would result in an ambiguous price), so that the trader will not be assaulted with nonessential information. Thus, the vocalized information will normally include only the least significant digits (Pips) of the displayed Dealable bid and offer prices, as well as status FIG. 3 shows how the display is transformed when the trader is not content to assume a passive role in which he merely reacts to deals solicited by other traders, but rather wishes to assume for himself the role of a Market Maker. In that case, a Maker's "Quote" panel 40 appears below the Taker's "Buy/Sell" panel 10 of FIG. 2, so that the trader may act both as a Maker and as a Taker, using a pointing device or a designated key of an alphanumeric keyboard to move between the two panels. The FIGS. 42, 44 and Pips 46, 48 have the same function as in the Taker's panel, and take their respective initial values from the current Best price. As in FIG. 2, the bid information is on the left, while the offer information is on the right.

Immediately below the price information, the trader is presented with the relevant bid and offer quantities 48,50, conventionally expressed in millions of US dollars. When the Maker's panel first appears, these quantities assume default values (10,10) established by the trader's personal trading profile. The trader is able to change any "Pips" or "quantity" amount shown on the Maker's panel by means of a numerical keyboard, using the enter key to move from field to field. Alternately, changes in the numerical data could be entered by selecting the field with a mouse or other pointing device, with a single click indicating an upward increment of one Pip and a double click indicating a downward increment of one Pip. Once the trader has changed the displayed numerical information to his satisfaction, he may then send a double sided bid/offer quote message (QuoteSubmit, FIG. 5) either by activating Send button 52 with a mouse or a conventional tab key and enter key, or by using a dedicated Send key on the trader's keyboard (not shown). Optionally, the trader may also send a single-side bid or offer, using the Bid button 54 or Offer button 56 instead of the Send button 52. Once the quote has been transmitted, an optional timer (not shown) may provide a visible and/or audible indication that a predetermined exposure time has elapsed. In addition, the trader may specify in his Trader Profile panel (FIG. 4) an optional automatic quote interrupt, whereby the quote is withdrawn once a predetermined maximum exposure time has been reached. At any time, the trader may use the Off button 60 to withdraw his current quote, whereupon he may compose and send a new quote.

Preferably, as will be discussed in additional detail with respect to FIG. 7, at the same time the system uses the quote and any associated credit prescreening information to determine the dealable prices to be displayed at each potential counterparty, the system also determines whether the current quote is equal to the Dealable price (either Best Dealable or Regular Dealable) available to any potential counterparty with whom bilateral credit currently exists, and if so, alerts the quoter that the displayed price has priority in time over any other available quote for that deal size (regular or small) from other trading floors and is subject to immediately being hit/taken (a "Red Dealable" quote, preferably indicated by red background) or is equal to such a Red Dealable (regular or small) quote from another trading floor (a "Joined" quote, preferably indicated by a = sign and a yellow background).

As shown in FIG. 4, each trader can call up a "Trader Profile" screen 70 to select his current trading currency 72, and also to establish or modify his personal default values for normal and maximum trading size 74, 76 and price time limit 78, and his preferences regarding optional automated trading protocols 78, such as canceling a quoted price that has been partially dealt (only a portion of the available size was matched with a qualified counterparty) or bettered (is not equal to the Best Dealable price for that size that is currently available to any potential counterparty with whom bilateral credit still exists). As noted previously, the trader may also elect to display the Regular 80 or Best 82 Dealable price, and the system also provides the trader with various options 82 for automatically "working the balance" in the event the trader attempts to buy or sell a particular quantity at the displayed Dealable price but misses the deal in whole ("complete") or in part ("partial"). Depending upon the particular option selected, the system automatically generates and transmits a bid at the last Dealable offer price if the trader was not able to buy the full quantity desired, for a quantity equal to the difference between the desired quantity and the quantity actually traded.

In addition, a Floor Administrator (preferably for internal security reasons a bank employee free of any trading responsibilities) has his own WS with a Floor Profile screen (not shown) which includes an option to prevent his own traders from trading with each other, and a maximum Business Day Credit Limit for each eligible counterparty which represents the maximum cumulative value of trades that may be executed by all traders of the Trading Floor with the designated counterparty. Alternately, the system could combine transactions from related Trading Floors, in which case the Floor Profile could merely identify a common credit facility having a single credit limit for each Trading Floor or groups of Trading Floors. The Floor Administrator also selects a warning percentage which the system uses to broadcast a warning message to the Administrator and all the traders on a given Floor that a particular counterparty has utilized a specified percentage of its available credit, in which case the traders may wish to alter their trading strategies and/or the Floor Administrator may choose to raise the applicable credit limit.

Figure 5:
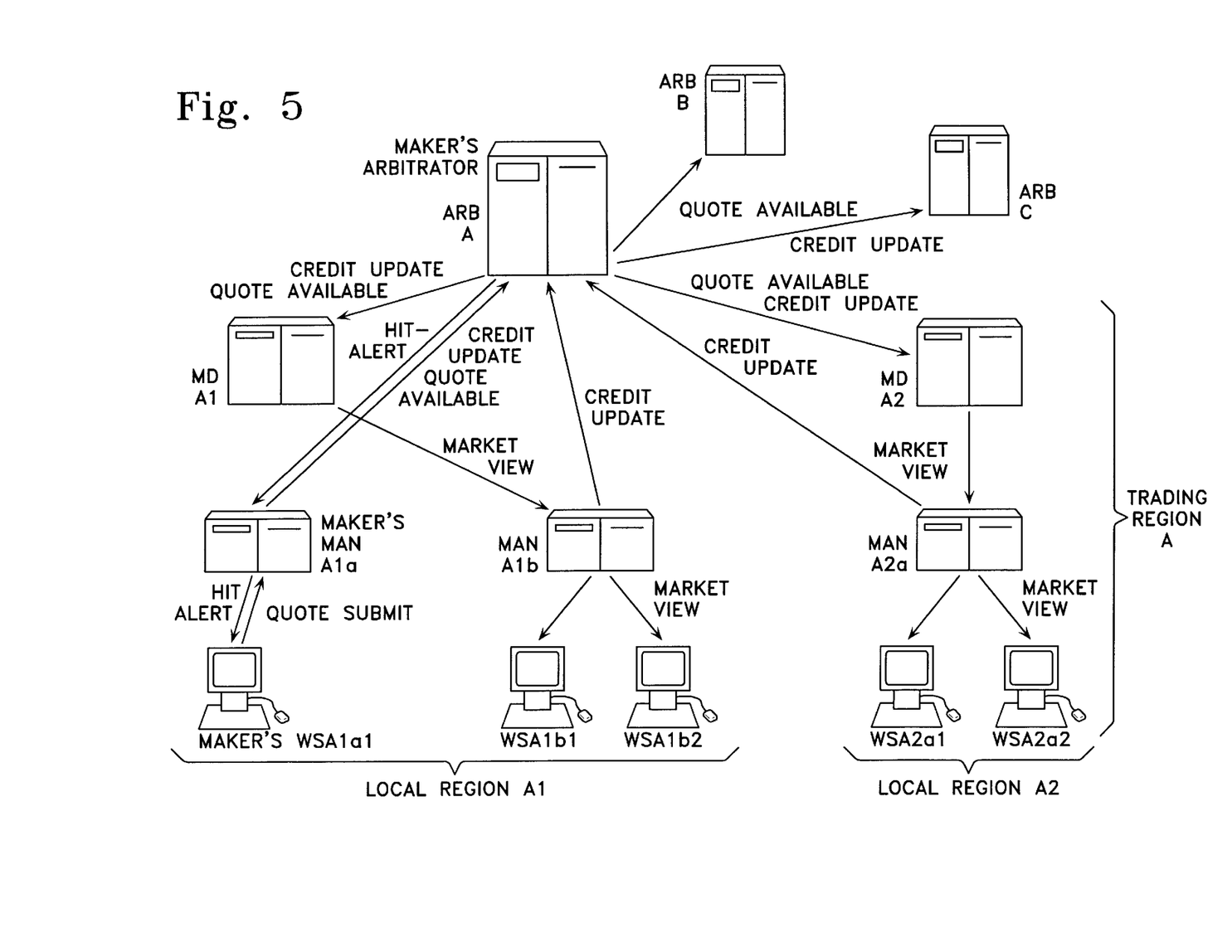
FIG. 5 shows the flow of messages in the communication network which are used to generate and distribute Dealable price information to each individual trader.

FIG. 5 shows the flow of electronic messages relating to the distribution of customized Dealable price information to each Trading Floor. The trader at WS A1$a$1 of Trading Floor A1$a$ uses his Price Quotation (Market Maker) Panel (FIG. 3) to generate a QuoteSubmit message to the Trading Floor's MAN (MAN A1$a$) in the form of a bid to buy at 1.7215 and an offer to sell at 1.7216. The MAN in turn logs the QuoteSubmit as two open quotations (one, if a single-sided quote) and forwards the QuoteSubmit message to the Maker's Arbitrator Node (ARB A) whose assigned geographical Trading Region includes the Maker's Trading Floor A1$a$1. In turn, ARB A updates an ordered list of available bids and an ordered list of available offers for the relevant currency pair, each ranked by price and time of receipt (preferably at the Maker's ARB), and containing data fields for indicating the Quantity (preferably expressed in Base Currency units) of the Local Currency still available for purchase or sale, and the Quantity reserved by the Arbitrator pending completion or failure of a pending deal resulting from a potential match initiated by the arbitrator and not yet confirmed by the Maker and Taker. A corresponding QuoteAvailable message is then transmitted from the Maker's ARB A to the MD's in its Trading Region MD A1, MD A2, and to the other ARB's for eventual distribution to the MD's and MAN's of other Trading Regions.

Each MAN (for example, MAN A1$b$) also transmits a CreditUpdate message to its associated ARB (ARB A) whenever the credit status for any of its potential counterparties (for example, A1$a$ or A2$a$) changes from CreditAvailable to CreditNotAvailable or vice versa, which the ARB then retransmits to its affected MD's and to the other affected ARB's.

Figure 6:
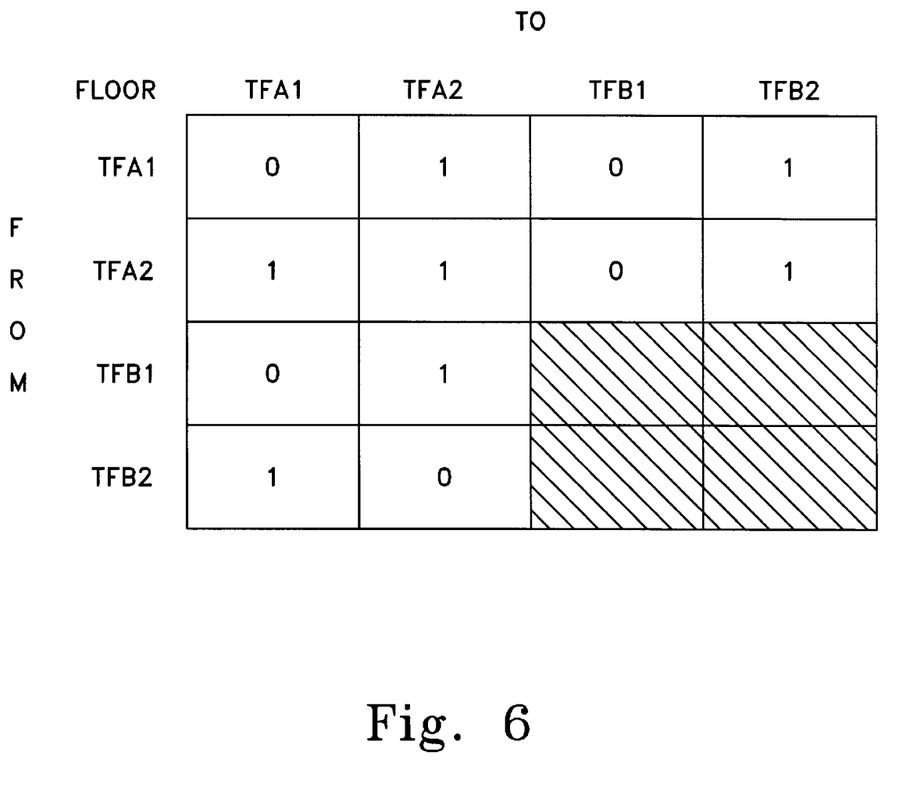
FIG. 6 depicts a Preauthorization Matrix.

The MD's then use the information in the received CreditUpdate messages to maintain a Preauthorization Matrix PM such as that shown in FIG. 6. The rows and columns of the matrix PM are associated with the various Trading Floors A1$a$, A1$b$, A2$a$, etc (including any Floors in other Trading Regions) and for each ordered pair of Trading Floors $\{TF_i, TF_j\}$ contains an indication as to whether $TF_i$, has extended any credit to $TF_j$. In the depicted example, credit exists on a bilateral basis between TFA1 and TFA2, no credit exists between TFA1 and TFB1, and credit has been extended unilaterally from TFA2 to TFB1, but not vice versa (as indicated by the "1" at the intersection of row TFB1 with column TFA2 and the "0" at the corresponding intersection of column TFB1 with row TFA2). From the main diagonal of the matrix it can be seen that only TFA2 permits its own traders to trade between themselves, as indicated by the "1" at the intersection of row TFA2 with column TFA2. Preferably, each MD only maintains a partial Preauthorization Matrix containing data only regarding credit extended from or to its associated MAN's to the other potential counterparties (MAN's) in the system. Thus, as indicated in FIG. 6 by cross hatching, some of the matrix entries may be blank.

The MD's use the QuoteAvailable messages to update their own ordered lists of available bids and offers; these ordered lists and the above-described Preauthorization Matrix are then used by the MD to calculate separate Dealable prices for each Trading Floor which are transmitted as MarketView messages to the affected MAN's, as will be described in more detail hereinafter with reference to FIG. 7. In addition, the MD's and/or ARB's use a similar procedure to identify which quotes from which Trading Floors are "Red Dealable" or "Joined" or "Bettered": A quote is "Red Dealable" only if it is the basis (best in price and time of the bids or offers originating from Trading Floors with which bilateral credit is still available) for a "Dealable" price displayed at one or more Trading Floors; once the "Red Dealable" quotes have been identified, the other quotes may be readily categorized as either "Joined" (if not first in time) or "Bettered" (if not best in price).

The actual deal is executed using a known two-stage commitment logging process (not shown) in which DealVerify and DealVerifyOk messages are logged by and transmitted from the Maker's MAN to the Taker's MAN and vice versa, after each MAN has verified that the other party to the deal has been extended sufficient credit by the Man's associated Trading Floor to cover the full deal quantity (otherwise the deal is aborted or is cut back in quantity). As an additional precaution, the Maker's MAN also checks that the quote has not been interrupted and that the WS from which the quote originated is still on-line, before any DealVerify or DealVerifyOk message is transmitted to the other Trading Floor (equivalently, each WS involved could perform its own logging and communicate directly with the other WS; however, this would complicate any subsequent automated deal recovery or rollback). A suitable logging, verification, and recovery/rollback process is disclosed in further detail in the commonly assigned U.S. patent application filed on Nov. 2, 1990 under Ser. No. 07/608,643 and entitled "FINANCIAL EXCHANGE SYSTEM HAVING AUTOMATED RECOVERY/ROLLBACK OF UNACKNOWLEDGED ORDERS". In any event, it should be understood that each ARB also maintains a log of potential matches which have not yet been verified or canceled by the affected MAN's, and that if these potential matches are not resolved within a predetermined time period, a similar automated rollback/recovery process can update the ARB's log on the basis of the logs maintained by the affected MAN's (for example, the match may be automatically canceled (rolled back) if either MAN does not have a corresponding entry in its respective log).

Figure 7:
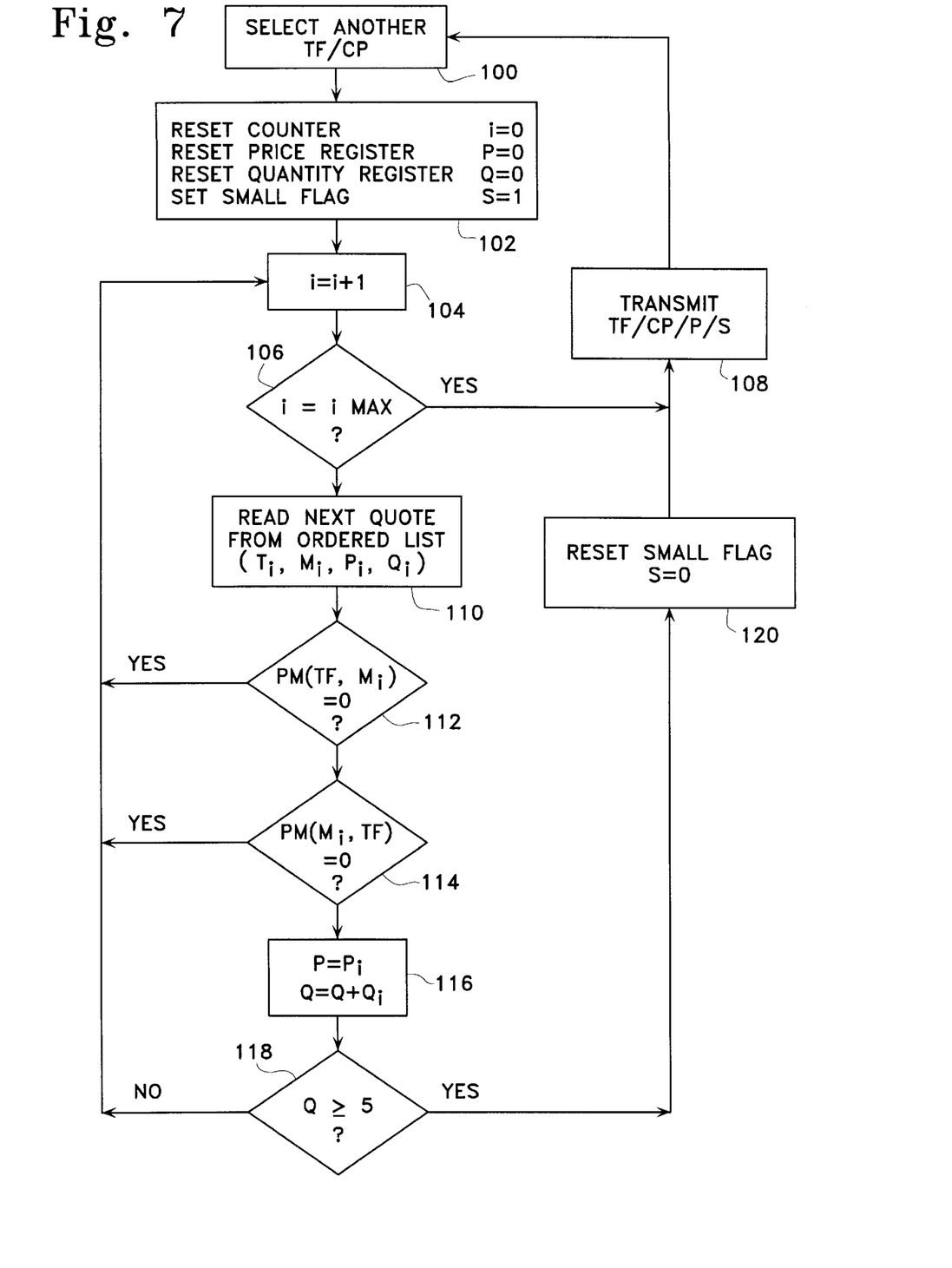
FIG. 7 is a functional flowchart showing how the Dealable price is computed.

FIG. 7 sets forth a possible implementation of how the MD computes a Dealable bid for a particular currency currently available to a particular Trading Floor, which may then be transmitted in the form of a MarketView message to that Trading Floor. Preferably, in order to avoid the transmission of redundant information and consequent excessive loading of the communication network, these MarketView messages are transmitted to a particular MAN only in response to a change in the Dealable price for the associated Trading Floor. Moreover, it may be more efficient to transmit information only for those active currency pairs which the Trading Floor's MAN has previously identified to its MD in an ActiveCurrencyPair message.

As indicated symbolically in FIG. 7 at block 100, the MD first selects the particular Trading Floor and Currency Pair for which the Dealable bid and offer price is to be computed (FIG. 7 shows only the computation of the Dealable bid price; a similar computation is then performed for the Dealable offer price before a new Trading Floor and/or Currency is selected). The MD then resets (block 102) the counters, registers and flags (i, P, Q, S) it will use in the computation of the Dealable price P.

What follows is a loop controlled by counter i, which points to the entries in the particular ordered Quote List associated with the Currency Pair and transaction type (bid or offer) then being processed, and which is incremented at the beginning of the loop (block 104). If the end of the Quote List has already been reached (Yes branch from decision block 106), the current values of the price P and the associated Small flag S are transmitted to the Trading Floor TF, together with an indication of the current Currency Pair CP (as previously noted, no such transmission is required if the price and Small flag for that Currency Pair to that Trading Floor are unchanged). However, if the end of the Quote List has not already been reached (No branch from decision block 106) the next quote is then read (block 110) and the relevant entries in the Preauthorization Matrix for the current Trading Floor (TF) and the Maker of the current quote (Mi) are then checked to determine if any previously extended credit has already been exhausted (decision blocks 112, 114). If either entry is "0" (indicating no credit available) control passes to the beginning of the loop (block 104), for processing of any remaining quotes in the applicable list.

However, if both relevant entries of the Preauthorization Matrix are "1" (indicating at least some credit is available on a bilateral basis between the current Trading Floor TF and the Maker $M_i$ from which the current quote $Q_i$ originated), the price Pi associated with quote $Q_i$ is loaded into the price register P, and the associated Available Quantity $Q_i$ is added to the contents of the Quantity register Q (block 116), which is then tested (decision block 118) to determine if at least a predetermined minimum quantity (eg, 5) is available to the current Trading Floor TF; otherwise control passes to the beginning of the loop (lock 102) and the process is repeated.

Assuming that the predetermined minimum quantity is available (Yes branch from block 118), the Small flag is reset to 0, and control passes to block 108, whereby the Dealable price is transmitted and the process is repeated.

It will be understood that the above assumes that a regular dealable price may be based on a potential composite deal which is based only on quotes for a small size of the currency in question and that a small dealable price is to be displayed only if such a regular dealable price is not available from any qualified counterparty or combination of qualified counterparties; if as mentioned previously it is desired to display only regular dealable prices from a single source and/or to give each trader the option of displaying either the Best Dealable price or the Regular Dealable price, then it may be necessary to scan the available quotes twice (once for the best available regular sized quote, once for the best available quote regardless of size) and/or to maintain separate registers for Best and Regular sized prices.

By using more than one MD each in the form of a dedicated computer, the computation of Dealable prices is distributed among several computers and is free from interruption by other unrelated tasks. Moreover, only a minimum amount of essential information is transmitted to the MD from its ARB, and from the MD to its MAN's. Thus even in a fast moving market, it should be possible to provide current Dealable price information to each Trading Floor. However, if an MD is responsible for distributing Dealable prices to more than two Trading Floors, it may be preferable to use a conventional pseudorandom generator to select the next Trading Floor, thus avoiding any bias inherent in the sequence in which the Dealable price information is computed and distributed.

As mentioned previously, the MD could, at the same time it reviews the ordered list of available quotes, also identify any quote which qualifies as "Red Dealable" or "Joined" and transmit a corresponding HitAlert message to the Maker's MAN (possibly via the Taker's ARB and the Maker's ARB). Alternatively, each ARB could repeat the process of FIG. 7 for each Trading Floor in the entire trading system, which would require more computational resources but fewer communication resources. In particular, such an alternate embodiment, as shown in FIG. 5, would require at most only one HitAlert message for each bid or offer (to the Maker's MAN from the Maker's own ARB).

We claim:

1. A computerized trading system for trading of financial instruments between traders trading at a plurality of trading floors, said system comprising a communication network for transmitting electronic messages, a plurality of trader terminals each associated with a respective one of said trading floors and connected to the communication network, for generating electronic price quotation messages including bid and/or offer prices, and communicating selected bid and offer price information based on price quotation messages originating from other said trading floors and received over the communication network, credit limit administration processing means connected to the communication network, for automatically determining whether a predetermined level of credit is currently respectively available from each trading floor to each of the other trading floors, and dealable price distribution processing means connected to said communication network and responsive to said price quotation messages as well as to said credit limit administration means for automatically transmitting dealable price messages to the terminals of at least one particular trading floor, said dealable price messages being derived only from price quotation messages from those trading floors for which said credit administration means has determined said predetermined level of credit is currently available on a bilateral basis both from and to said particular trading floor.

2. The trading system of claim 1, wherein said selected price information communicated by the terminal at said particular trading floor comprises said dealable price information.

3. The trading system of claim 2, wherein said dealable price information comprises the best price for a predetermined quantity available from any of said trading floors with which bilateral credit currently exists.

4. The trading system of claim 3, wherein said dealable price information is the best price for said predetermined quantity available as a single quote from a single one of said trading floors with which bilateral credit currently exists.

5. The trading system of claim 3, wherein said dealable price information is determined from the best prices for said predetermined quantity available on a composite price based on a plurality of quotes from one or more of said trading floors with which bilateral credit currently exists.

6. The trading system of claim 3, wherein said dealable price information further comprises the best price for any quantity available from at least one of said trading floors with which bilateral credit currently exists.

7. The trading system of claim 6, wherein trades are possible for a small quantity less than said predetermined quantity, and said trader terminals display a price applicable only to a small, but otherwise dealable, quantity when said predetermined quantity is not available to an associated trading floor.

8. The trading system of claim 1, wherein said dealable price information is communicated in the form of a visible display.

9. The trading system of claim 1, wherein said dealable price information is communicated to at least one of the traders in the form of vocalized text.

10. The trading system of claim 1, further comprising a plurality of access nodes connected to the communication network, including a first access node associated only with a first trading floor and a second access node associated only with a second trading floor, for maintaining a record of all trades executed on behalf of an associated trading floor, and one or more distribution nodes connected to the communication network, wherein said access nodes collectively comprise said credit authorization processing means, said distribution nodes collectively comprise said dealable price distribution processing means, said access nodes transmit over the communication network to said distribution nodes credit update messages which indicate whether said predetermined level of credit is currently available on a unilateral basis from one trading floor to another trading floor without indicating the extent of any credit currently remaining above said predetermined level, said dealable price distribution processing means maintains at each of said distribution nodes an ordered list of at least those of said price quotation messages which are not yet withdrawn or reserved and a preauthorization matrix whose individual entries collectively indicate whether or not said predetermined level of credit is available on a bilateral basis between each of its respective trading floors and each of said plurality of trading floors, said dealable price information is transmitted from each said distribution node to one or more of said access nodes for eventual transmission to associated ones of said terminals each said access node is located on the premises of a respective trading floor and contains only credit information originating with said respective trading floor, said credit limit administration processing means transmits an electronic credit update message to said distribution nodes whenever a predetermined minimum level of credit becomes available or is no longer available to a particular said trading floor, and said credit update message does not specify the amount of credit available.

11. The trading system of claim 10, wherein those quotes which are for a price not worse than a particular said dealable price and which originate from a trading floor which has bilateral credit available with the trading floor associated with said particular dealable price are identified as "dealable quotes".

12. The trading system of claim 11, wherein the record of executed trades maintained by each access node is used to automatically recover or rollback pending transactions which have been identified by another node as potential trades but which have not yet been fully executed or canceled.

13. The trading system of claim 10, wherein said price quotation message includes designation of the trading floor from which the quotation originates, said trading floor designation is used by said each distribution node in deriving said dealable price messages and said dealable price message does not include any designation of the trader or trading floor from which the quotation originates, when received by any said market access node or trader terminal.

14. The trading system of claim 10, wherein said current credit limit is derived from a predetermined maximum trade volume and the actual cumulative trade volume between said associated trading floor and one other trading floor dealing in a plurality of types of financial instruments.

15. The trading system of claim 14, wherein said current credit limit is a combined limit applicable to a plurality of related trading floors.

16. The trading system of claim 1, wherein said dealable price distribution processing means is responsive to unilateral credit update messages over the communications network from the individual trading floors.

17. A computerized trading method for trading of financial instruments between traders trading at respective trading floors, said method comprising generating electronic price quotation messages including bid and/or offer prices for a particular financial instrument from one or more of the trading floors, automatically administering credit on a unilateral basis from each of the trading floors to the other trading floors, automatically deriving a respective dealable price message for said particular financial instrument only from price quotation messages from those other trading floors for which bilateral credit currently remains both from and to a particular trading floor, and automatically communicating said dealable price message on an anonymous basis to a trader at said particular trading floor without disclosing the origin of the price quotation messages from which the dealable price message was derived.

18. The computerized trading method of claim 17, wherein said dealable price message is communicated by displaying it at a terminal on said particular trading floor.

19. The computerized trading method of claim 17, wherein said dealable price message is communicated in the form of vocalized text.

20. The computerized trading method of claim 17, wherein said dealable price message comprises a dealable price which is the best price currently available to the particular trading floor from said other trading floors with which bilateral credit currently remains.

21. The computerized trading method of claim 20, wherein said dealable price is available as a single quote from a single one of said other trading floors with which said bilateral credit currently remains.

22. The computerized trading method of claim 21, wherein said dealable price is a regular dealable price for a predetermined quantity and is based on a plurality of quotes from one or more of said other trading floors with which said bilateral credit currently remains.

23. The computerized trading method of claim 22, wherein said dealable price message also comprises a small dealable price applicable only to a quantity less than said predetermined quantity.

24. The computerized trading method of claim 21 wherein a quote for a price that is not worse than said dealable price and that originates from an originating trading floor which has bilateral credit with said particular trading floor, is identified on a terminal of the originating trading floor as a "dealable quote".

25. The computerized trading method of claim 17, wherein said unilateral credit is maintained at an access node of said network in the form of a confidential credit data base containing an initial unilateral credit limit and any remaining unilateral credit currently available from the particular trading floor to the other trading floor, said credit data base is accessible only by said particular trading floor, said access node is located on the premises of said particular trading floor and does not contain credit data originating from any other trading floor, bilateral credit is considered as currently existing between any two trading floors if at least a predetermined level of remaining unilateral credit is currently available from each of the two trading floors to the other trading floor, the dealable price message is generated at a distribution node of said network that is remote from said access node and that does not have access to any data reflecting any remaining unilateral credit in excess of said predetermined level, said access node transmits an electronic credit update message to said distribution node whenever said predetermined minimum level of unilateral credit becomes available or becomes unavailable from the particular trading floor to the other trading floor.

26. The computerized trading method of claim 25, wherein a record of executed trades maintained by each access node is used both to generate said credit update messages and to automatically recover or rollback pending transactions which have been identified by another node as potential trades but which have not yet been fully executed or canceled.

27. The computerized trading method of claim 25, wherein said price quotation message includes a designation of the trading floor from which the quotation originates, said designation is used by said each distribution node in deriving said dealable price messages, and said dealable price message does not include any designation of the trader or trading floor from which the quotation originates.

28. The computerized trading method of claim 25, wherein said remaining unilateral credit from a first trading floor to a second trading floor is derived from a predetermined initial credit limit extended from said first trading floor to said second trading floor and the actual cumulative trade volume between said first and second trading floors for a plurality of types of financial instruments including but not limited to said particular financial instrument.

29. The computerized trading method of claim 25, wherein said remaining unilateral credit is established on behalf of a plurality of related trading floors constituting a common credit facility and is derived from a predetermined initial credit limit extended from the common credit facility to a particular group of trading floors.

* * * * *

Disclaimer 6,014,627 — Michael Togher, New York, NY; Michael F. Dunne, Boonton, NJ; Richard Hartheimer, Morris Plains, NJ. CREDIT MANAGEMENT FOR ELECTRONIC BROKERAGE SYSTEM. Patented January 11, 2000. Disclaimer filed June 2, 2004, by the assignee, EBS Dealing Resources, Inc.

Hereby enters this disclaimer to claims 1-16 of said patent.

*(Official Gazette, September 21, 2004)*